United States Patent
Guard et al.

(10) Patent No.: US 9,262,019 B2
(45) Date of Patent: Feb. 16, 2016

(54) TOUCH SENSOR WITH CONDUCTIVE LINES HAVING DIFFERENT WIDTHS

(75) Inventors: David Brent Guard, Southampton (GB); Esat Yilmaz, Santa Cruz, CA (US); Carl Carley, Basingstoke (GB)

(73) Assignee: Atmel Corporation, San Jose, CA (US)

( * ) Notice: Subject to any disclaimer, the term of this patent is extended or adjusted under 35 U.S.C. 154(b) by 38 days.

(21) Appl. No.: 13/331,022

(22) Filed: Dec. 20, 2011

(65) Prior Publication Data

US 2013/0127772 A1    May 23, 2013

Related U.S. Application Data

(60) Provisional application No. 61/563,007, filed on Nov. 22, 2011.

(51) Int. Cl.
*G06F 3/046* (2006.01)
*G06F 3/044* (2006.01)

(52) U.S. Cl.
CPC ..................................... *G06F 3/044* (2013.01)

(58) Field of Classification Search
CPC ......... G06F 3/041; G06F 3/045; G06F 3/046; G06F 2203/04112; G06F 2203/0411; G06F 3/044; H05K 1/0296
USPC .......... 345/173, 174; 324/660, 658; 977/811; 178/18.01–18.07
See application file for complete search history.

(56) References Cited

U.S. PATENT DOCUMENTS

| | | | |
|---|---|---|---|
| 6,911,973 B2 * | 6/2005 | Katsuki | G06F 3/0436 178/18.04 |
| 6,924,789 B2 | 8/2005 | Bick | |
| 7,382,139 B2 * | 6/2008 | Mackey | 324/660 |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |
| 8,355,006 B2 | 1/2013 | Park et al. | |
| 8,456,444 B2 | 6/2013 | Ishizaki et al. | |
| 8,723,824 B2 | 5/2014 | Myers | |
| 8,797,285 B2 | 8/2014 | Guard | |
| 2002/0167619 A1 | 11/2002 | Bietsch et al. | |

(Continued)

FOREIGN PATENT DOCUMENTS

WO    WO 2012/129247    9/2012

OTHER PUBLICATIONS

U.S. Appl. No. 61/454,936, filed Mar. 21, 2011, Myers.

(Continued)

*Primary Examiner* — Lun-Yi Lao
*Assistant Examiner* — Johny Lau
(74) *Attorney, Agent, or Firm* — Baker Botts, L.L.P.

(57) ABSTRACT

In one embodiment, a touch sensor includes one or more meshes of conductive material. Each of the meshes comprising a plurality of conductive lines. At least a first conductive line of the plurality of conductive lines has a width that is greater than a width of at least a second conductive line of the plurality of conductive lines.

22 Claims, 2 Drawing Sheets

(56) References Cited

U.S. PATENT DOCUMENTS

| | | |
|---|---|---|
| 2004/0239650 A1 | 12/2004 | Mackey |
| 2006/0097991 A1 | 5/2006 | Hotelling et al. |
| 2008/0158183 A1 | 7/2008 | Hotelling et al. |
| 2008/0309635 A1 | 12/2008 | Matsuo |
| 2009/0205879 A1 | 8/2009 | Halsey, IV et al. |
| 2009/0219257 A1* | 9/2009 | Frey et al. .............. 345/173 |
| 2009/0273570 A1* | 11/2009 | Degner et al. .......... 345/173 |
| 2009/0315854 A1* | 12/2009 | Matsuo .................. 345/174 |
| 2010/0026664 A1* | 2/2010 | Geaghan ................ 345/174 |
| 2010/0045614 A1* | 2/2010 | Gray et al. ............ 345/173 |
| 2010/0045615 A1* | 2/2010 | Gray et al. ............ 345/173 |
| 2010/0045632 A1 | 2/2010 | Yilmaz et al. |
| 2010/0302201 A1* | 12/2010 | Ritter et al. .......... 345/174 |
| 2011/0007020 A1 | 1/2011 | Hong et al. |
| 2011/0018557 A1* | 1/2011 | Badaye .................. 324/658 |
| 2011/0310033 A1 | 12/2011 | Liu et al. |
| 2011/0310037 A1 | 12/2011 | Moran et al. |
| 2012/0075238 A1* | 3/2012 | Minami et al. ........ 345/174 |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2012/0261242 A1 | 10/2012 | Guard et al. |
| 2012/0262382 A1 | 10/2012 | Guard et al. |
| 2012/0262412 A1 | 10/2012 | Guard et al. |
| 2013/0076612 A1 | 3/2013 | Myers |
| 2013/0234974 A1 | 9/2013 | Guard |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
Guard et al., U.S. Appl. No. 13/089,061, Non-final Office Action, Nov. 23, 2012.
Guard et al., U.S. Appl. No. 13/089,061, Response to Non-final Office Action, Mar. 25, 2013.
Guard et al., U.S. Appl. No. 13/089,061, Non-final Office Action, Jun. 20, 2013.
Guard et al., U.S. Appl. No. 13/089,061, Response to Non-final Office Action, Dec. 17, 2013.
Guard et al., U.S. Appl. No. 13/312,405, Non-final Office Action, Jul. 19, 2013.
Guard et al., U.S. Appl. No. 13/312,405, Response to Non-final Office Action, Dec. 18, 2013.
Guard et al., U.S. Appl. No. 13/347,859, Non-final Office Action, Nov. 2, 2012.
Guard et al., U.S. Appl. No. 13/347,859, Response to Non-final Office Action, Mar. 4, 2013.
Guard et al., U.S. Appl. No. 13/347,859, Final Office Action, May 21, 2013.
Guard et al., U.S. Appl. No. 13/347,859, RCE and Response, Sep. 20, 2013.
Guard et al., U.S. Appl. No. 13/347,859, Non-Final Office Action, Nov. 1, 2013.
Guard, U.S. Appl. No. 13/413,306, Non-final Office Action, Oct. 8, 2013.
Guard, U.S. Appl. No. 13/413,306, Response to Non-final Office Action, Jan. 8, 2014.
Guard et al., U.S. Appl. No. 13/312,405, Final Rejection, Mar. 6, 2014.
Guard et al., U.S. Appl. No. 13/347,859, Notice of Appeal, Jan. 31, 2014.
Guard et al., U.S. Appl. No. 13/347,859, Applicant-Initiated Interview Summary, Feb. 6, 2014.
Guard et al., U.S. Appl. No. 13/347,859, Applicant Summary of Interview with Examiner, Mar. 10, 2014.
David B. Guard, U.S. Appl. No. 13/413,306, Final Office Action dated Apr. 11, 2014.
David B. Guard, U.S. Appl. No. 14/413,306, Request for Continued Continuation dated Jul. 11, 2014.
David B. Guard, U.S. Appl. No. 14/413,306, Non-final Office Action dated Sep. 12, 2014.
David B. Guard, U.S. Appl. No. 14/413,306, Response dated Feb. 12, 2015.

* cited by examiner

TOUCH SENSOR WITH CONDUCTIVE LINES HAVING DIFFERENT WIDTHS

RELATED APPLICATION

This application claims the benefit, under 35 U.S.C. §119 (e), of U.S. Provisional Patent Application No. 61/563,007 filed 22 Nov. 2011.

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
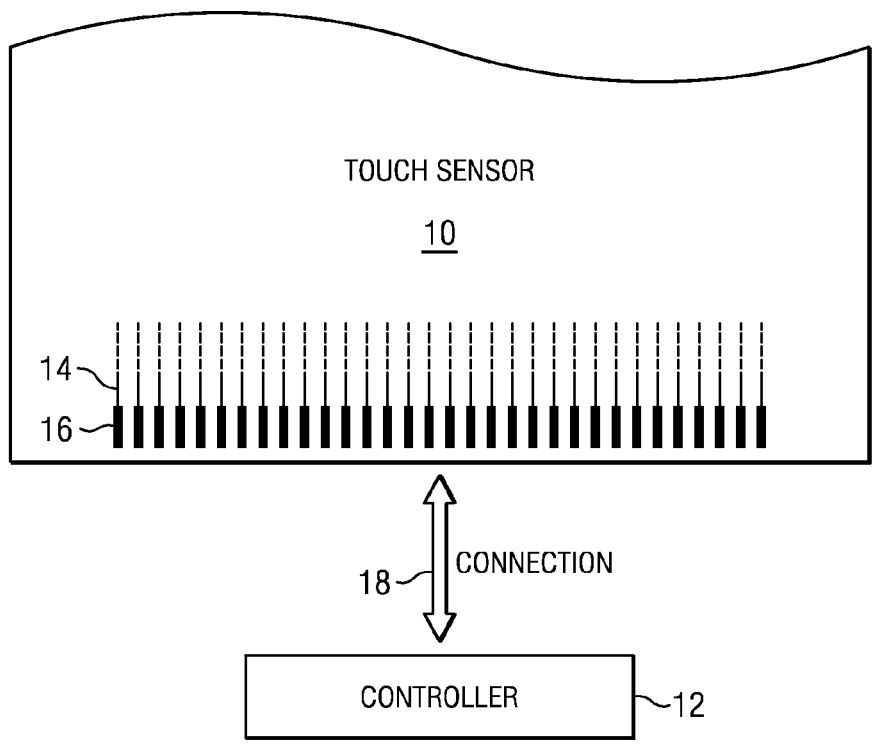
FIG. 1 illustrates an example touch sensor 10 with an example touch-sensor controller 12.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a drive electrode or a sense electrode) may be an area of conductive material forming a shape, such as for example a disc, square, rectangle, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape, where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fills having particular patterns, this disclosure contemplates any suitable electrodes made of any suitable conductive material forming any suitable shapes with any suitable fills having any suitable patterns. Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, where appropriate. Similarly, reference to a sense line may encompass one or more sense electrodes making up the sense line, and vice versa, where appropriate.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs) or digital signal processors (DSPs)) of a device that includes touch sensor 10 and touch-sensor controller 12, which may respond to the touch or proximity input by initiating a function of the device (or an application running on the device) associated with it. Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below. The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be inserted into an electro-mechanical connector (such as a zero insertion force wire-to-board connector); in this embodiment, connection 18 may not need to include an FPC. This disclosure contemplates any suitable connection 18 between touch-sensor controller 12 and touch sensor 10.

Figure 2A:
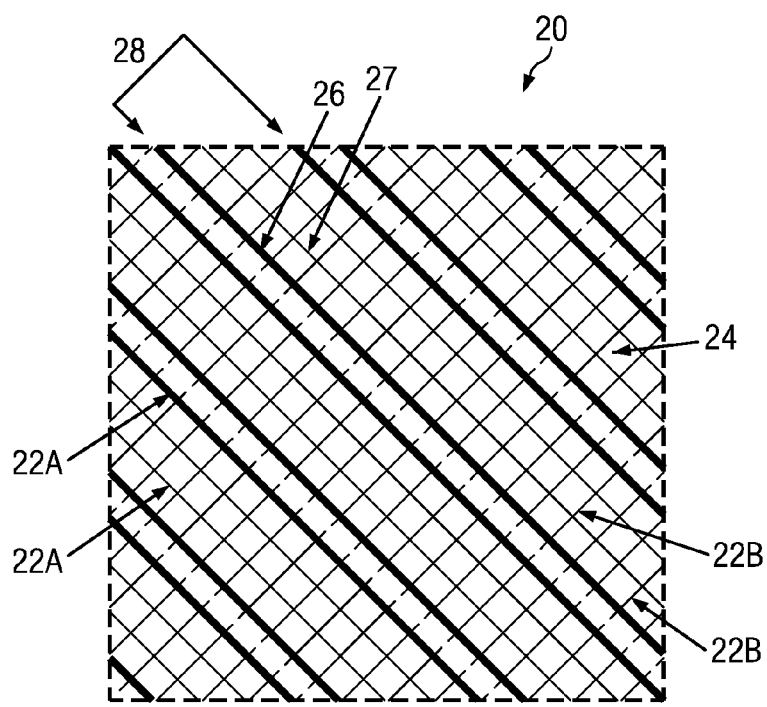
FIGS. 2A-2B illustrate two example mesh patterns of a touch-sensitive mesh layer.
Figure 2B:
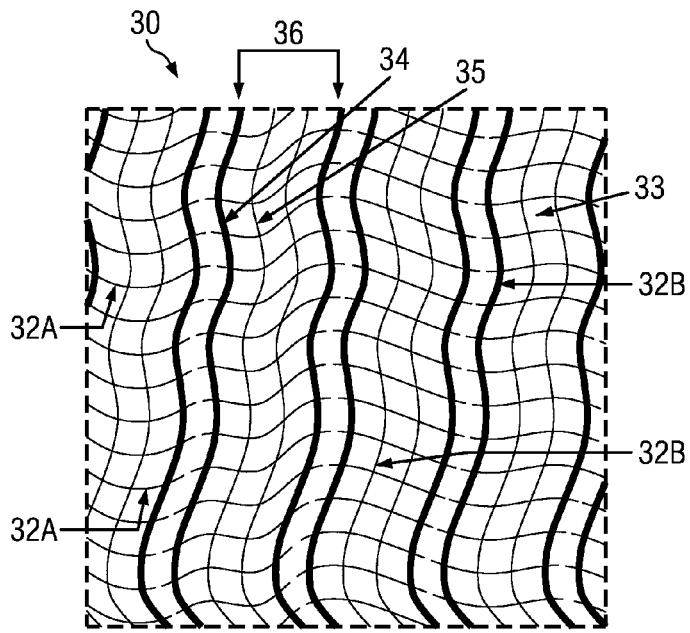

FIGS. 2A-2B illustrate two example mesh patterns of a touch-sensitive mesh layer. As discussed above, an electrode may be made of fine lines 22A-B of metal or other conductive material (e.g., copper, silver, or a copper- or silver-based material) and the lines 22A-B of conductive material may occupy the area of the electrode shape in a hatched, mesh, or other suitable pattern. In the example of FIG. 2A, an example mesh pattern 20 of a touch-sensitive mesh layer is formed from substantially straight lines 22A-B of conductive material. Mesh pattern 20 may be formed using two sets 22A-B of substantially parallel lines of conductive material. Mesh pattern 20 may be made up of an array of polygon-shaped mesh cells 24 formed from substantially orthogonal intersections between lines 22A with lines 22B of conductive material. As an example and not by way of limitation, first set 22A and second set 22B of conducting lines may be disposed such that a total line density is less than approximately 10% of a surface area. Thus, the contribution of the conductive lines to the reduction of transmission of light through mesh pattern 20 may be less than approximately 10%. In particular embodiments, the conductive lines may result in an attenuation of, for example, 3-10% of the transmission of light through mesh pattern 20.

In the example of FIG. 2A, example mesh pattern 20 of a touch-sensitive mesh layer further includes one or more conductive lines 22A-B that have a width that is greater than a width of one or more other conductive lines 22A-B. As an example and not by way of limitation, mesh pattern 20 may include a conductive line 26 and a conductive line 27 (which are examples of two of conductive lines 22A-B). Conductive line 26 may have a width that is greater than the width of conductive line 27. In particular embodiments, conductive line 27 may have any width that is less than the width of conductive line 26. As an example and not by way of limitation, if the width of conductive line 26 is 5 μm, conductive line 27 may have any width that is less than 5 μm, such as 4 μm, 3 μm, 2 μm, or any other width that is less than 5 μm. In particular embodiments, because conductive line 27 has a width that is less than the width of conductive line 26, the total line density of example mesh pattern 20 may be reduced. As such, the reduced width of conductive line 27 may increase the transmittance in a device utilizing example mesh pattern 20.

In the example of FIG. 2A, example mesh pattern 20 of a touch-sensitive mesh layer further includes one or more electrodes, such as, for example, electrode 28. In particular embodiments, electrode 28 may include a plurality of conductive lines 22A-B. Furthermore, in particular embodiments, one or more of the conductive lines 22A-B may be primary conductive lines while one or more of the conductive lines 22A-B may be secondary conductive lines. In particular embodiments, the width of the secondary conductive lines may be less than that of the primary conductive lines. As an example and not by way of limitation, conductive line 26 (which may have a width that is greater than that of conductive line 27) may be a primary conductive line, while conductive line 27 may be a secondary conductive line. In particular embodiments, since the primary conductive lines have a greater width than that of the secondary conductive lines, if one or more of the secondary conductive lines break (or are otherwise unable to carry an alternating voltage or charge), the primary conductive lines and the remaining secondary conductive lines may still carry the alternating voltage applied to a drive electrode or the charge induced on a sense electrode. As such, the primary conductive lines and remaining secondary conductive lines may still provide a suitable level of electrical connectivity across mesh pattern 20. Electrode 28 may have any suitable pattern for the primary conductive lines and secondary conductive lines. As an example and not by way of limitation, the primary conductive lines of electrode 28 may be the outermost conductive lines of electrode 28, while the secondary conductive lines of electrode 28 may be the innermost conductive lines of electrode 28.

Although this disclosure describes or illustrates particular mesh patterns, this disclosure contemplates any suitable mesh pattern formed using conductive lines with any suitable configuration. As an example and not by way of limitation, a mesh pattern may include any particular pattern of conductive lines, any particular pattern of primary conductive lines, any particular pattern of secondary conductive lines, and any particular pattern of electrodes.

In the example of FIG. 2B, mesh pattern 30 is formed from conductive lines 32A-B which are not substantially straight. Non-straight line patterns 32A-B may be used to reduce the likelihood of the metal line patterns causing interference or moiré patterns. The non-straight pattern of the conductive lines 32A-B of mesh pattern 30 may disperse—and hence reduce—the visibility of reflections from conductive lines 32A-B when illuminated by incident light. As an example and not by way of limitation, each of conductive lines 32A-B of mesh pattern 30 may have a substantially wavy, or sinusoidal, shape, as shown in FIG. 2B. Mesh pattern 30 may be made up of an array of mesh cells 33 formed from intersections between lines 32A with lines 32B of conductive material.

In the example of FIG. 2B, example mesh pattern 30 of a touch-sensitive mesh layer further includes one or more conductive lines 32A-B that have a width that is greater than a width of one or more other conductive lines 32A-B (such as conductive line 34 having a greater width than the width of conductive line 35). Mesh pattern 30 further includes one or more electrodes, such as, for example, electrode 36. Furthermore, the electrodes of mesh pattern 30 may have primary conductive lines and secondary conductive lines, where the primary conductive lines (such as, for example, conductive line 34) have a width that is greater than the width of the secondary conductive lines (such as, for example, conductive line 35).

Although this disclosure describes or illustrates particular mesh patterns, this disclosure contemplates any suitable mesh pattern formed using conductive lines with any suitable configuration. As an example but not by way of limitation, a mesh pattern may include any particular pattern of conductive lines, any particular pattern of primary conductive lines, any particular pattern of secondary conductive lines, and any particular pattern of electrodes.

Figure 3:
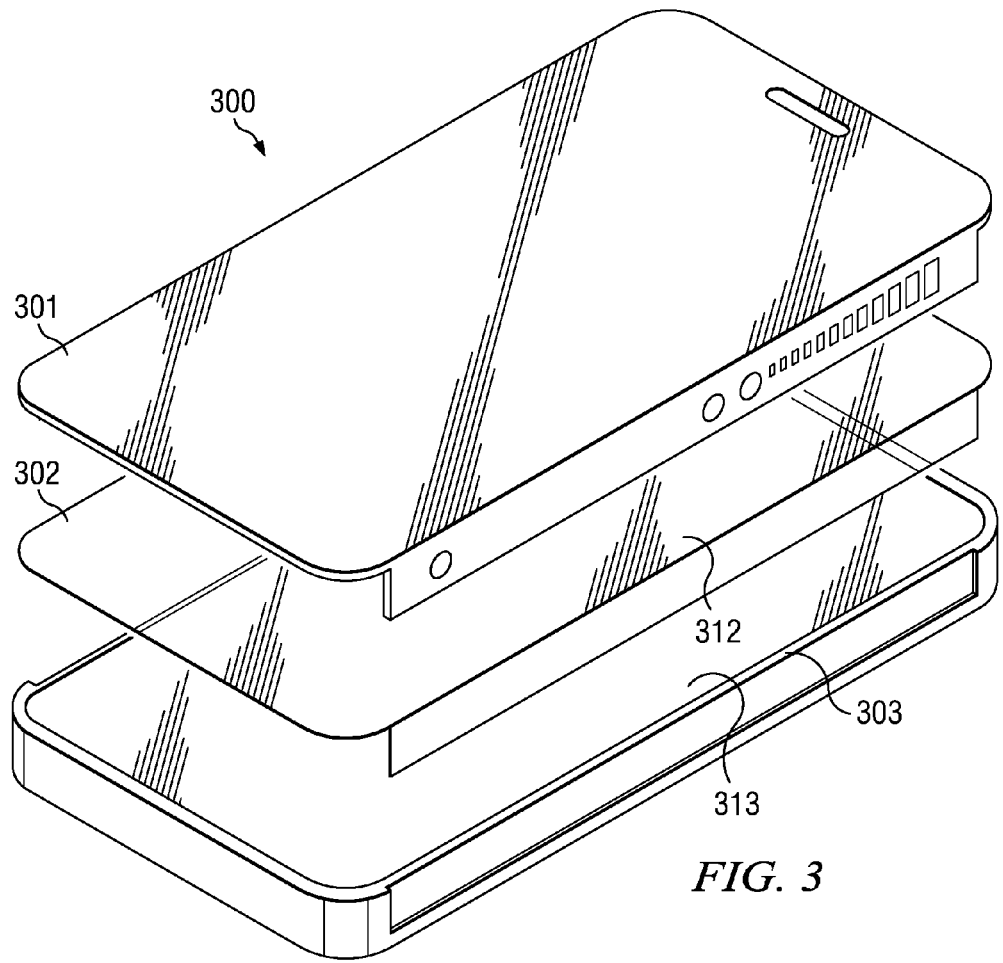
FIG. 3 illustrates an example mobile telephone that incorporates a touch sensor with conductive lines having different widths.

FIG. 3 illustrates an example mobile telephone that incorporates a touch sensor with conductive lines having different widths. In the example of FIG. 3, example mobile telephone 300 incorporates a touch-sensitive apparatus 312 wrapped around an example display 313. Substrate 302 may include or have attached to it tracking areas, which may include tracks providing drive and sense connections to and from the drive and sense electrodes of touch-sensitive apparatus 312. In particular embodiments, an electrode pattern of touch-sensitive apparatus 312 made from metal-mesh technology with a copper, silver, or other suitable metal mesh, as described above. Substrate 302 may have the electrode pattern disposed on a surface. Substrate 302 and the conductive material of the electrode pattern may be flexible, enabling the conductive material to wrap around the left and right edges of the surface to left-side and right-side surfaces. For sharper edges (e.g., with radii of less than 1 mm), the flexible conductive material of the electrode pattern may be thicker or wider at the sharper edges than at the flat portions of surfaces. In particular embodiments, the electrode pattern may wrap around an edge 303 of example mobile phone 300. In other particular embodiments, touch-sensitive apparatus 312 may be wrapped around a curved surface. The curved surface may be curved in one dimension or in two dimensions. As an example and not by way of limitation, touch-sensitive apparatus 312 may be wrapped over surfaces that are substantially perpendicular to each other or, if there is no substantial distinction between surfaces (such as, for example, a pebble-shaped or curved device), an angle of deviation between the surfaces of 45° or greater. Although this disclosure describes and illustrates a particular use of touch-sensitive apparatus 312 in a particular device, this disclosure contemplates any suitable use of touch-sensitive apparatus 312 in any suitable device.

Example display 313 may be a liquid crystal display (LCD), a light-emitting diode (LED) display, an LED-backlight LCD, or other suitable display and may be visible though cover panel 301 and substrate 302, as well as the electrode pattern disposed on substrate 302. Although this disclosure describes and illustrates a particular display and particular display types, this disclosure contemplates any suitable device display and any suitable display types.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An apparatus comprising:
   a touch sensor comprising one or more electrodes, each of the one or more electrodes comprising a mesh, the mesh comprising a plurality of first conductive lines and a plurality of second conductive lines, the plurality of first conductive lines and the plurality of second conductive lines of the mesh of a particular electrode being disposed on a first layer of a substrate, wherein:
   the plurality of first conductive lines of the mesh of the particular electrode define at least a portion of a border of the particular electrode;
   the plurality of second conductive lines of the mesh of the particular electrode are positioned at least partially between the plurality of first conductive lines of the mesh of the particular electrode;
   the plurality of first conductive lines each have a first uniform width and the plurality of second conductive lines each have a second uniform width, the first uniform width being wider than the second uniform width; and
   the plurality of second conductive lines of the mesh of the particular electrode interconnect the plurality of first conductive lines of the mesh of the particular electrode; and
   one or more computer-readable non-transitory storage media coupled to the touch sensor and embodying logic that is configured when executed to control the touch sensor.

2. The apparatus of claim 1, wherein the one or more electrodes comprise a first electrode and a second electrode, the first electrode being disposed on a first surface of the substrate and the second electrode being disposed on a second surface of the substrate opposite the first surface.

3. The apparatus of claim 1, wherein the one or more electrodes comprise a first electrode and a second electrode, the first electrode being disposed on a surface of the substrate and the second electrode being disposed on a surface of a second substrate.

4. The apparatus of claim 1, wherein each of one or more of the first and second conductive lines is a substantially straight line.

5. The apparatus of claim 1, wherein each of one or more of the first and second conductive lines is not substantially straight.

6. The apparatus of claim 1, wherein each of one or more of the first and second conductive lines is substantially sinusoidal.

7. The apparatus of claim 1, wherein at least one of the second conductive lines of the mesh of the particular electrode extends from inside the border of the particular electrode to beyond the border of the particular electrode.

8. The apparatus of claim 7, wherein the particular electrode is a sense electrode or a drive electrode.

9. The apparatus of claim 1, wherein the width of at least one of the first or second conductive lines is less than 5 micrometers.

10. The apparatus of claim 1, wherein the substrate is flexible.

11. The apparatus of claim 1, wherein the one or more electrodes comprises two or more meshes positioned in a same plane.

12. A touch sensor comprising:
    a substrate; and
    one or more electrodes, each of the one or more electrodes comprising a mesh, the mesh comprising a plurality of first conductive lines and a plurality of second conductive lines, the plurality of first conductive lines and the plurality of second conductive lines of the mesh of a particular electrode being disposed on a first layer of the substrate, wherein:
    the plurality of first conductive lines of the mesh of the particular electrode define at least a portion of a border of the particular electrode;
    the plurality of second conductive lines of the mesh of the particular electrode are positioned at least partially between the plurality of first conductive lines of the mesh of the particular electrode;
    the plurality of second conductive lines of the mesh of the particular electrode interconnect the plurality of first conductive lines of the mesh of the particular electrode; and
    the plurality of first conductive lines each have a first uniform width and the plurality of second conductive lines each have a second uniform width, the first uniform width being wider than the second uniform width.

13. The touch sensor of claim 12, wherein the one or more electrodes comprise a first electrode and a second electrode, the first electrode being disposed on a first surface of the substrate and the second electrode being disposed on a second surface of the substrate opposite the first surface.

14. The touch sensor of claim 12, wherein the one or more electrodes comprise a first electrode and a second electrode, the first electrode being disposed on a surface of the substrate and the second electrode being disposed on a surface of a second substrate.

15. The touch sensor of claim 12, wherein each of one or more of the first and second conductive lines is a substantially straight line.

16. The touch sensor of claim 12, wherein each of one or more of the first and second conductive lines is not substantially straight.

17. The touch sensor of claim 12, wherein each of one or more of the first and second conductive lines is substantially sinusoidal.

18. The touch sensor of claim 12, wherein at least one of the second conductive lines of the mesh of the particular electrode extends from inside the border of the particular electrode to beyond the border of the particular electrode.

19. The touch sensor of claim 18, wherein the particular electrode is a sense electrode or a drive electrode.

20. The touch sensor of claim 12, wherein the width of at least one of the first or second conductive lines is less than 5 micrometers.

21. The touch sensor of claim 12, wherein the substrate is flexible.

22. The touch sensor of claim 12, wherein the one or more electrodes comprises two or more meshes positioned in a same plane.

* * * * *